United States Patent
Thorstensson et al.

(10) Patent No.: US 7,226,501 B2
(45) Date of Patent: Jun. 5, 2007

(54) PROCESS FOR THE MANUFACTURE OF A BITUMEN-AGGREGATE MIX SUITABLE FOR ROAD PAVEMENT

(75) Inventors: Bengt-Arne Thorstensson, Älta (SE); Keith Shaw, Co Durham (GB); Thomas Wallin, Täby (SE); Leif-Göran Ståhlgren, Enskede Gård (SE)

(73) Assignee: Akzo Nobel N.V., Aruhem (NL)

( * ) Notice: Subject to any disclaimer, the term of this patent is extended or adjusted under 35 U.S.C. 154(b) by 0 days.

(21) Appl. No.: 10/567,277

(22) PCT Filed: Jun. 23, 2004

(86) PCT No.: PCT/SE2004/001003

§ 371 (c)(1),
(2), (4) Date: Mar. 30, 2006

(87) PCT Pub. No.: WO2005/012433

PCT Pub. Date: Feb. 10, 2005

(65) Prior Publication Data

US 2006/0219135 A1 Oct. 5, 2006

(30) Foreign Application Priority Data

Aug. 1, 2003 (SE) .................................... 0302161

(51) Int. Cl.
*B01F 17/14* (2006.01)
*C07C 211/63* (2006.01)
*C07C 211/22* (2006.01)
*C08L 95/00* (2006.01)
*C09D 195/00* (2006.01)

(52) U.S. Cl. ................... 106/277; 516/40; 516/907; 516/908; 564/291; 564/294; 564/511

(58) Field of Classification Search ................ 106/277; 516/40, 907, 908; 564/291, 511, 294
See application file for complete search history.

(56) References Cited

U.S. PATENT DOCUMENTS

| 2,508,431 | A |   | 5/1950  | Smith et al. ................. 106/273 |
|-----------|---|---|---------|----------------------------------------|
| 2,508,432 | A |   | 5/1950  | Smith et al. ................. 106/273 |
| 2,508,924 | A |   | 5/1950  | Mertens et al. .............. 106/273 |
| 2,759,975 | A | * | 8/1956  | Chiddix et al. ............. 507/240 |
| 3,359,738 | A | * | 12/1967 | Dybalski et al. ............ 405/265 |
| 3,518,101 | A |   | 6/1970  | Gzemski et al. ............. 106/277 |
| 4,775,419 | A |   | 10/1988 | Gilmore et al. .......... 106/281.1 |
| 4,895,600 | A |   | 1/1990  | Chang et al. ............. 106/284.1 |
| 5,073,297 | A |   | 12/1991 | Schilling .................... 252/355 |

OTHER PUBLICATIONS

International Search Report, No. PCT/SE2004/001003, Sep. 27, 2004.

* cited by examiner

*Primary Examiner*—David M. Brunsman
(74) *Attorney, Agent, or Firm*—Ralph J. Mancini

(57) ABSTRACT

The present invention relates to an aqueous quick-setting bitumen-aggregate mix suitable for cold pavement of roads, parking places, sidewalks and the like. The bitumen-aggregate mix is manufactured by mixing a mineral aggregate, water, a de-emulsifier, containing hydraulic cement, and a cationic oil-in-water bitumen emulsion, containing, as an emulsifier, a salt of a tertiary diamine and a phosphoric acid. The diamine has the formula (I), where one or two of the groups $R_1$, $R_2$, $R_4$ and $R_5$ designate a hydrocarbon group of 6–22, preferably 8–20 carbon atoms, and the remaining $R_1$, $R_2$, $R_4$ and $R_5$ groups are an alkyl group with 1–4 carbon atoms, and/or a group $—(A)_2H$, where A is an alkyleneoxy group with 2–3 carbon atoms, and s is a number from 1–4, $R_3$ is an alkylene group with 2–4 carbon atoms and n is a number from 0–2.

13 Claims, No Drawings

PROCESS FOR THE MANUFACTURE OF A BITUMEN-AGGREGATE MIX SUITABLE FOR ROAD PAVEMENT

This application is a 371 of PCT/SE04/01003, filed 23 Jun. 2004.

This case was filed under the Patent Cooperation Treaty on Jun. 23, 2004 and claims priority of Swedish application serial No. 0302161-5 filed on Aug. 1, 2003.

The present invention relates to an aqueous quick-setting bitumen-aggregate mix suitable for cold pavement of roads, parking places, sidewalks and the like. The bitumen-aggregate mix is manufactured by mixing a mineral aggregate, water, a de-emulsifier, containing hydraulic cement, and a cationic oil-in-water bitumen emulsion, containing, as an emulsifier, a salt of a tertiary diamine and a phosphoric acid.

It is well-known in the art to prepare cationic oil-in-water emulsions of bitumen and to mix these emulsions with inorganic mineral aggregates. When mineral aggregates and the cationic emulsion are mixed, the emulsion will "break" due to the attraction between the positively charged bitumen droplets and negatively charged aggregate surfaces. The cationic bitumen droplets will deposit on the aggregate surfaces and be bonded to aggregates by the electrostatic action at the interface between the bitumen droplets and the aggregates. As emulsifiers, several salts between acids and amine compounds have been suggested. Frequently, acidified amidoamines, imidazolines, fatty tetraamines and quaternary ammonium compounds and mixtures thereof are used. The acid used is normally hydrochloric acid, but also phosphoric acids and other acids containing one or more acid hydrogen atoms have been used.

When paving, it is today a general practice to use a mobile mixer, which, at the site of the work, continuously mixes the aggregate, water and the emulsion for obtaining an aqueous bitumen-aggregate mix and continuously spreads the aqueous bitumen-aggregate mix on the surface to be paved. It is of essential importance that the mix has a suitable consistency for paving but also that there is a rapid build-up of cohesion between the bitumen on one side and the aggregates and the surface covered on the other.

Thus, the U.S. Pat. No. 3,518,101 describes an aqueous asphalt emulsion, which contains, as an emulsifier, a salt of a polybasic acid selected from the group consisting of oxalic acid, tartaric acid and citric acid, with a diamine containing an alkyl group from about 12 to about 22 carbon atoms. The amine groups could be primary, secondary and/or tertiary. However, the setting and the build-up of cohesion of the emulsion-aggregate mixes described in this patent are slow and vary also with the types of aggregates and the particle size of the aggregates. The U.S. Pat. No. 5,073,297 discloses an aqueous bitumenous emulsion-aggregate obtained by emulsifying bitumen in water with a particular cationic emulsifier, which is a reaction product between modified polyamines with certain polycarboxylic acids and anhydrides. In the preparation of the bitumenous emulsion, an acid solution of the emulsifier is used. For instance, hydrochloric, sulphuric, and phosphoric acid or the like can be added until a pH-value below 7 is reached and a clear emulsifier solution is obtained. The set time of the slurry is long and in order to shorten the set time an addition of cement is disclosed.

From the above references, it is evident, that the break of the emulsion and the development of high cohesion between the bitumen and the aggregates substantially vary in rate depending on the temperature and also to a minor extent on the type and particle size of the aggregate present in the mix.

Furthermore, emulsions prepared from bitumen with a low acid content are comparatively slow-setting and develop only slowly the cohesion between the bitumen and the aggregates and between the bitumen and the surface covered. A quick setting and a rapid build-up of cohesion are considerably advantageous, since the paved area can be opened to public use shortly after the work has been performed.

It has now been found that the above-mentioned disadvantages can be essentially reduced by using a specific emulsifier and de-emulsifier system. The system makes it possible to produce an excellent aqueous bitumen emulsion and to obtain an aqueous bitumen-aggregate mix suitable for cold paving. The mix has a quick-setting and develops a strong cohesion between the bitumen and the aggregates already after about 15 minutes after paving.

According to the invention an aqueous bitumen-aggregate mix ready for cold paving is manufactured by mixing an oil-in-water acidic bitumen emulsion containing an emulsifier, a mineral aggregate, additional water and a de-emulsifier at a temperature from 0 to 40° C., characterized in that the bitumen emulsion has a pH-value between 1 and 5, preferably between 1 and 4, and that the emulsifier contains a salt between a polyvalent phosphoric acid and a diamine of the formula

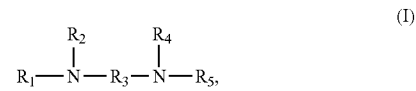

where one or two of the groups $R_1$, $R_2$, $R_4$ and $R_5$ designate a hydrocarbon group of 6–22, preferably 8–20 carbon atoms, and the remaining $R_1$, $R_2$, $R_4$ and $R_5$ groups are alkyl groups with 1–4, preferably 1–2 carbon atoms and/or groups of the formula —$(A)_sH$, where A is an alkyleneoxy group with 2–3 carbon atoms, preferably ethyleneoxy, and s is a number from 1–4, preferably 1, $R_3$ is an alkylene group with 2–4 carbon atoms, preferably 3 carbon atoms, and that the de-emulsifier contains hydraulic cement.

The emulsifiers of formula I have a good emulsifying ability and rapidly develop a strong cohesion between the aggregates and the bitumen when the aqueous bitumen emulsion is broken with a de-emulsifier containing the hydraulic cement. The rate of the breaking of the emulsion and the development of cohesion can easily be regulated and controlled by the amount added of the hydraulic cement. A quick-setting and strong cohesion are not only obtained when the acid content of the bitumen has a medium or high acid content, but also when the acid content is low, for example between 0.05 and 1 mg KOH/g of the bitumen. The emulsifier-de-emulsifier system is well suited to be used in mobile mixers, which, at the place of work, continuously mix aggregate, additional water, de-emulsifier and the bitumen emulsion to form an aqueous bitumen-aggregate mix and continuously spread the aqueous bitumen-aggregate mix on the surface to be paved. In addition, the emulsifier-de-emulsifier system can easily be adjusted according to the existing conditions, e.g. the temperature, to optimize the mixing time and the rate and strength of the cohesion of the aqueous bitumen-aggregate mix.

Suitable diamines of formula I are those, where at least one group is a methyl group and at least one group is hydroxyethyl, that is to say a group of the formula $(A)_sH$, where A is an ethyleneoxy group and s is 1. The ratio between the average number of methyl groups to the average number of ethyleneoxy groups is preferably between 1:6 and 3:1. Other suitable diamines are compounds of formula I, where the remaining groups are all methyl groups, and compounds, where the remaining groups are all groups of the formula $(A)_sH$, where A is an alkyleneoxy group of 2–3 carbon atoms and s is a number of 1–4. Preferably A is an ethyleneoxy group and s is 1. Also mixtures of compounds, where the remaining groups are only methyl groups, and compounds, where the remaining groups are only groups of the formula $(A)_sH$, where A and s have the meanings mentioned above, can advantageously be used. In such mixtures the weight ratio between the compounds containing only methyl groups and the compounds containing only the $(A)_sH$ groups are usually between 1:10 and 10:1. By varying the ratio between the number of methyl groups and ethyleneoxy groups, it has also surprisingly been shown that it is possible to further control the cohesion and the mixing time. A high amount of methyl groups shortens the mixing time and speeds up the development of a high cohesion, while the presence of ethyleneoxy groups improves the workability of the bitumen and the bitumen-aggregate mix. These properties of the different diamines of formula I can advantageously be used in order to adapt the emulsifier to the acid content of the bitumen and to the temperature when paving.

According to the invention, the hydraulic cement can be ordinary Portland cement, low heat Portland cement, white Portland cement, rapid hardening Portland cement, or mixtures thereof. Suitably the hydraulic cement contains 75–100% by weight of ordinary Portland cement or white Portland cement. The hydraulic cement can also be combined with 0–25% by weight of aluminium sulphate, an alum compound, lime or gypsum or mixtures thereof. These additions prolong the mixing time which can be favourable when the paving is performed at high temperatures.

The aggregate is an inorganic material, which normally contains a densely graded inorganic material, such as blast furnace slag and minerals, e.g. granite, limestone and dolomite. The particle size distribution suitably includes both fines and coarser particles. A typical aggregate has a particle size distribution, where the whole amount of the aggregate passes through a sieve in the interval from a No. 4 mesh sieve to a No 10. mesh sieve, while a fraction of 15–20% by weight of the aggregate passes through a sieve in the interval from No. 40 to No. 200 mesh sieve as described in ASTM C 136.

Suitable kinds of bitumen for use in the present invention are those commonly used in road paving and in the techniques of cold emulsion mix, slurry seal, microsurfacing and the like and include but are not limited to those having an AC grade from AC-15 to AC-35 as well as those modified with polymers such as SBS and EVA.

An aqueous bitumen-aggregate mix according to the invention normally contains
100 parts by weight of an aggregate,
6–20, preferably 8–15 parts by weight of bitumen,
0.1–3, preferably 0.2–2.5 parts by weight of the salt between the polyvalent phosphoric acid and the diamine of formula I, and
0.1–2, preferably 0.2–1.5 parts by weight of hydraulic cement.

The aqueous bitumen-aggregate mix can be produced by mixing a blend, containing the mineral aggregate, 5–35% of water calculated on the weight of the aggregate and 0.1–2.0, preferably 0.2–1.5% by weight of hydraulic cement calculated on the weight of the aggregate, with 10–40% of the cationic, acidic oil-in-water emulsion of bitumen calculated on the weight of the aggregate. Said bitumen emulsion normally contains 50–70% by weight of bitumen, 0.4–20, preferably 2–14% by weight of a salt between a polyvalent phosphoric acid and a diamine of formula I, and 21–43%, preferably 25–40%, by weight of water. The total amount of water in the bitumen-aggregate mix is normally between 12 and 25% by weight of the aggregate.

Also other components may be present in the bitumen-aggregate mix and in the bitumen emulsion. Thus, the bitumen emulsion may contain other emulsifiers which are nonionic or cationic surfactants, containing at least one hydrocarbon group of 6–22 carbon atoms, preferably 8–22 carbon atoms, such as amide compounds, ethyleneoxy-containing amide compounds, acidified amidoamines, ethyleneoxy-containing amidoamines, imidazolines, tetraamines and quaternary ammonium compounds, and mixtures thereof. Specific examples of other emulsifiers are salts between acids, suitably polyvalent acids, such as a polyvalent phosphoric acid, and an imidazoline compound of the formula

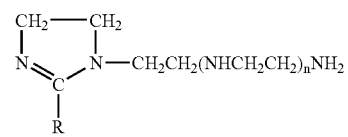

where R is an alkyl group of 5–21, preferably 7–19 carbon atoms and n is a number from 0–3; or an amidoamine compound of the formula

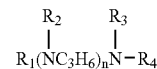

where one or two of the groups $R_1$, $R_2$, $R_3$ and $R_4$ is an acyl group of 6–22, preferably 8–20 carbon atoms and the remaining groups $R_1$, $R_2$, $R_3$ and $R_4$ are lower alkyl groups of 1–4 carbon atoms, preferably methyl, hydroxyethyl, hydroxypropyl or hydrogen and n is a number from 1 to 4, with the proviso that at least one nitrogen atom is a part of an amine group. The bitumen aggregate mix can also contain an additional organic binder, for example a latex, selected from the group consisting of SBR, polychloroprene and natural latex and mixtures thereof. The latex may be incorporated in the bitumen emulsion or directly into the mix. It may be necessary to use cationic or nonionic grades of latex compatible with the emulsion, as is well known in the art of emulsion formulation. The latex binder may impart desirable properties to the cured mixture including improved durability. The bitumen aggregate mix may also contain other components such as fibres and pigments.

EXAMPLE

Several aqueous bitumen-aggregate mixes were prepared by mixing a) 15 parts by weight of an aqueous oil-in-water bitumen emulsion containing 9.75 parts by weight of bitumen, 0.53 parts by weight of a latex, if any, and an emulsifier in accordance with Table 1, b) 100 parts by weight of an aggregate of granite, proportioned in accordance with ASTM C 136, c) 9 parts by weight of water, and d) ordinary Portland cement in accordance with Table 1. The emulsifiers used in the preparation were the following.

Emulsifier A A salt between tallow trimethyl propylenediamine and orthophosphoric acid Emulsifier B A salt between tri(hydroxyethyl)oleyl propylenediamine and orthophosphoric acid Emulsifier C A salt between hydrochloric acid and the reaction product between 50% by weight of tall oil fatty acid and 50% by weight of tetraethylenepentamine Emulsifier D 50% by weight of a salt between orthophosphoric acid and the reaction product between equal amounts of tall oil fatty acid and tetraethylenepentamine and 50% by weight of a salt between ortho-phosphoric acid and the reaction product between equal amounts of tall oil fatty acid and 3-(dimethylamino)propylamine The pH of the emulsions containing the emulsifiers A, B and D was adjusted with orthophosphoric acids to the pH-values given in Table 1, while the pH-value of emulsions only containing emulsifier C was adjusted with hydrochloric acid.

During the preparation, the mixing time was recorded in accordance with the International Slurry Surfacing Association; Design Technical Bulletins, TB-113 Trial Mix Procedure for Slurry Seal Systems. Immediately after mixing, a surface was covered by the aqueous bitumen-aggregate mixes at different temperatures with a laboratory asphalting machine. The cohesion values, kg-c, for each cover were determined according to Design Technical Bulletins, TB-139, Test Method for Classify Emulsified Asphalt Aggregate Mixture System by modified Cohesion Tester Measurement of Set and Cure Characteristics. The results obtained are shown in Table 2.

TABLE 1

Composition of aqueous bitumen aggregate mixes

| Mix No. | Emulsifier Type | Parts by weight | Latex | Bitumen type | pH | Cement parts by weight |
|---|---|---|---|---|---|---|
| I | C | 1.5 | Yes | LA | 2.0 | 0.5 |
| II | D | 1.0 | Yes | LA | 3.0 | 0.5 |
| 1 | A/C | 0.6/0.4 | Yes | LA | 3.0 | 0.5 |
| 2 | A/B | 0.6/0.6 | — | HA | 3.0 | 1.0 |
| 3 | A/B | 0.5/0.5 | — | HA | 2.5 | 1.0 |
| 4 | A/B | 1.0/1.0 | — | HA | 2.5 | 1.0 |
| 5 | A | 1.2 | — | LA | 1.5 | 1.0 |
| 6 | A | 1.2 | — | LA | 3.5 | 1.0 |
| 7 | B | 0.88 | — | LA | 2.5 | 1.0 |
| 8 | B | 1.25 | — | LA | 2.5 | 1.0 |

LA = Low acid content (acid value of 0.4 mg KOH/g of bitumen)
HA = High acid content (acid value of 4.0 mg KOH/g of bitumen)

TABLE 2

Mixing times and cohesion values of the mixes at different temperatures

| Mix No. | Temp °C. | Mixing time, sec | Cohesion value, kg-c | | | |
|---|---|---|---|---|---|---|
| | | | 15 min | 30 min | 60 min | 90 min |
| I | 20 | 150 | NT | NT | NT | 7 |
| II | 10 | 240 | NT | 12 | 15 | 18 |
| | 20 | 180 | NT | 14 | 17 | 20 |
| | 35 | 40 | 18 | 20 | 22 | 22 |
| 1 | 10 | 160 | 16 | 18 | 24 | NT |
| | 20 | 120 | 18 | 20 | 23 | NT |
| | 35 | 90 | 20 | 24 | NT | NT |
| 2 | 10 | 315 | 21 | 23 | NT | NT |
| | 21 | 105 | 22 | 24 | NT | NT |
| | 29 | 90 | 21 | 23 | NT | NT |
| 3 | 10 | 240 | 21 | 24 | NT | NT |
| | 21 | 90 | 22 | 24 | NT | NT |
| 4 | 21 | 210 | 22 | 24 | NT | NT |
| 5 | 13 | 300 | 22 | 24 | NT | NT |
| | 22 | 175 | 22 | 24 | NT | NT |
| 6 | 22 | 110 | 22 | 23 | NT | NT |
| 7 | 22 | 110 | NT | 22 | 24 | NT |
| 8 | 22 | 180 | NT | 22 | 24 | NT |

NT = not tested

The aqueous bitumen-aggregate mixes ought to have mixing times above 60 seconds, suitably above 90 seconds, and to quickly generate a high cohesion value suitably of 23 kg-c or higher. From the test it is evident that mixes 1–8 according to the invention fulfill these designs. The comparison mixes I and II need in general much longer times to develop a high cohesion than the mixes 1–8.

What is claimed is:

1. A method for manufacturing an aqueous bitumen-aggregate mix by mixing an oil-in-water bitumen emulsion containing an emulsifier, a mineral aggregate, additional water and a de-emulsifier at a temperature from 0 to 40° C., wherein the bitumen emulsion has a pH-value between 1–5 and the emulsifier contains a salt between a polyvalent phosphoric acid and a diamine of the formula

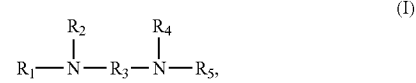

(I)

where one or two of the groups $R_1$, $R_2$, $R_4$ and $R_5$ designate a hydrocarbon group of 6–22 carbon atoms, and the remaining $R_1$, $R_2$, $R_4$ and $R_5$ groups are an alkyl group with 1–4 carbon atoms, and/or a group —$(A)_sH$, where A is an alkyleneoxy group with 2–3 carbon atoms, and s is a number from 1–4, and $R_3$ is an alkylene group with 2–4 carbon atoms and the de-emulsifier contains a hydraulic cement.

2. The method of claim 1, wherein the diamine of formula I contains at least one methyl group and at least one group of the formula $(A)_sH$. where A is ethyleneoxy and s is 1.

3. The method of claim 2, wherein the ratio of the average number of methyl groups to the average number of ethyleneoxy groups in the diamines of formula I is from 1:6 to 3:1.

4. The method of claim 1, wherein the diamine of formula I contains a compound, where one or two of the groups $R_1$, $R_2$, $R_4$ and $R_5$ designate a hydrocarbon group of 6–22 carbon atoms and the remaining groups $R_1$, $R_2$, $R_4$ and $R_5$ are all methyl, or a compound, where the remaining groups $R_1$, $R_2$, $R_4$ and $R_5$ are all groups of the formula $(A)_sH$, where A and s have the meaning as defined in claim 1, or a mixture of these compounds.

5. The method of claim 4, wherein the diamine of formula I contains a mixture of the two types of compounds as defined in claim 4 in a weight ratio from 1:10 to 10:1.

6. The method of the claim 1, wherein the weight ratio between the diamine salt of the emulsifier and the cement is from 0.15–1.5.

7. The method of claim 1 wherein the phosphoric acid is orthophosphoric acid.

8. The method of claim 1 wherein the hydraulic cement is a Portland cement.

9. The method of claim 1 wherein the bitumen has an acid content between 0.05 and 1 mg KOH/g of the bitumen.

10. The method of claim 1 wherein one or two of the groups $R_1$, $R_2$, $R_4$ and $R_5$ designate a hydrocarbon group of 8–20 carbon atoms.

11. A diamine salt that comprises the product of a polyvalent phosphoric acid and a diamino of the formula

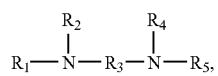 (I)

where one or two of the groups $R_1$, $R_2$, $R_4$ and $R_5$ designate a hydrocarbon group of 6–22 carbon atoms, and the remaining $R_1$, $R_2$, $R_4$ and $R_5$ groups are an alkyl group with 1–4 carbon atoms, and/or a group —$(A)_sH$, where A is an alkyleneoxy group with 2–3 carbon atoms, and s is a number from 1–4, and $R_3$ is an alkylene group with 2–4 carbon atoms.

12. An acidic oil-in-water bitumen emulsion, characterized in that it has a pH-value between 1 and 5 and contains 0.4–20% by weight of the salt of claim 11.

13. An aqueous bitumen-aggregate mix comprising 100 parts by weight of an aggregate, 6–20 parts by weight of bitumen, 0.1–3 parts by weight of the salt defined in claim 11, and 0.1–2 parts by weight of hydraulic cement.

* * * * *